(12) United States Patent
Sato et al.

(10) Patent No.: US 6,697,221 B2
(45) Date of Patent: Feb. 24, 2004

(54) PERPENDICULAR MAGNETIC RECORDING HEAD WITH INVERTED TRAPEZOIDAL MAIN MAGNETIC POLE LAYER

(75) Inventors: Kiyoshi Sato, Niigata-ken (JP);
Toshinori Watanabe, Niigata-ken (JP);
Hideki Gochou, Niigata-ken (JP);
Hisayuki Yazawa, Niigata-ken (JP);
Kiyoshi Kobayashi, Niigata-ken (JP);
Akira Koyama, Fukushima-ken (JP)

(73) Assignee: Alps Electronic Co., Ltd., Tokyo (JP)

( * ) Notice: Subject to any disclaimer, the term of this patent is extended or adjusted under 35 U.S.C. 154(b) by 76 days.

(21) Appl. No.: 10/024,965

(22) Filed: Dec. 18, 2001

(65) Prior Publication Data
US 2002/0080523 A1 Jun. 27, 2002

(30) Foreign Application Priority Data
Dec. 26, 2000 (JP) .......................... 2000-394641

(51) Int. Cl.⁷ .................................. G11B 5/39
(52) U.S. Cl. ...................................... 360/126
(58) Field of Search ................. 360/126, 317, 360/318, 122; 29/603.07; 369/13.32

(56) References Cited

U.S. PATENT DOCUMENTS

| | | | | |
|---|---|---|---|---|
| 5,225,953 A | * | 7/1993 | Wada et al. | 360/126 |
| 5,440,530 A | * | 8/1995 | Fedeli et al. | 369/13.32 |
| 5,454,158 A | * | 10/1995 | Fontana et al. | 29/603.07 |
| 5,850,326 A | * | 12/1998 | Takano et al. | 360/122 |
| 6,128,166 A | * | 10/2000 | Tanaka et al. | 360/317 |
| 6,292,329 B1 | * | 9/2001 | Sato et al. | 360/126 |
| 6,304,415 B1 | * | 10/2001 | Tateyama et al. | 360/126 |
| 6,385,008 B1 | * | 5/2002 | Santini et al. | 360/126 |

* cited by examiner

Primary Examiner—Tianjie Chen
(74) Attorney, Agent, or Firm—Brinks Hofer Gilson & Lione

(57) ABSTRACT

A perpendicular magnetic recording head includes an auxiliary magnetic pole layer exposed at a surface facing a recording medium, a main magnetic pole layer deposited on the auxiliary magnetic pole layer with an insulating layer therebetween, a coil layer for applying a recording magnetic field to the auxiliary magnetic pole layer and the main magnetic pole layer, and a connecting layer placed on the auxiliary magnetic pole layer toward the back from the surface facing the recording medium. At the surface facing the recording medium, the upper base of the main magnetic pole layer is wider than the lower base so that the width in the track width direction of the main magnetic pole layer gradually increases with distance from the auxiliary magnetic pole layer. A method for making such a perpendicular magnetic recording head is also disclosed.

7 Claims, 15 Drawing Sheets

PERPENDICULAR MAGNETIC RECORDING HEAD WITH INVERTED TRAPEZOIDAL MAIN MAGNETIC POLE LAYER

BACKGROUND OF THE INVENTION

1. Field of the Invention

The present invention relates to a perpendicular magnetic recording head for writing by applying a perpendicular magnetic field to a recording medium, such as a disk having a hard film, and to a method for making the same. More particularly, the invention relates to a perpendicular magnetic recording head which suppresses fringing in a recorded pattern and which is suitable for an increased recording density, and to a method for making the same.

2. Description of the Related Art

In a perpendicular magnetic recording apparatus, magnetic data is written in a recording medium, such as a disk, at high densities. FIG. 27 is a sectional view which shows a general structure of a perpendicular magnetic recording head used in a perpendicular magnetic recording apparatus.

As shown in FIG. 27, a perpendicular magnetic recording head H is provided on a trailing edge of a slider 1 which floats above or slides over a recording medium. For example, the perpendicular magnetic recording head H is disposed between a nonmagnetic film 2 and a nonmagnetic coating film 3 on a trailing edge 1a of the slider 1.

The perpendicular magnetic recording head H includes an auxiliary magnetic pole layer 4 composed of a ferromagnetic material and a main magnetic pole layer 5 composed of a ferromagnetic material formed at a distance from the auxiliary magnetic pole layer 4. A front end 4a of the auxiliary magnetic pole layer 4 and a front end 5a of the main magnetic pole layer 5 are exposed at a surface Ha facing a recording medium Md. The auxiliary magnetic pole layer 4 and the main magnetic pole layer 5 are magnetically coupled to each other at a magnetic coupling section which is provided toward the back from the surface Ha.

A nonmagnetic insulating layer 7 composed of an inorganic material, such as $Al_2O_3$ or $SiO_2$, is placed between the auxiliary magnetic pole layer 4 and the main magnetic pole layer 5. A front end 7a of the nonmagnetic insulating layer 7 is exposed at the surface Ha between the front end 4a and the front end 5a.

A coil layer 8 composed of a conductive material, such as Cu, is embedded in the nonmagnetic insulating layer 7.

As shown in FIG. 27, a thickness hw of the front end 5a of the main magnetic pole layer 5 is smaller than a thickness hr of the front end 4a of the auxiliary magnetic pole layer 4. The width in the track width direction (in the X direction in the drawing) of the front end 5a of the main magnetic pole layer 5 corresponds to a track width Tw, which is sufficiently smaller than the width in the track width direction of the front end 4a of the auxiliary magnetic pole layer 4.

The recording medium Md on which magnetic recording is performed by the perpendicular magnetic recording head H moves in the Y direction relative to the perpendicular magnetic recording head H. The recording medium Md is provided with a hard film Ma on the surface and with a soft film Mb inside.

When a recording magnetic field is induced to the auxiliary magnetic pole layer 4 and the main magnetic pole layer 5 by applying an electrical current to the coil layer 8, a leakage recording magnetic field between the front end 4a of the auxiliary magnetic pole layer 4 and the front end 5a of the main magnetic pole layer 5 is transmitted through the hard film Ma perpendicularly and then passes through the soft film Mb. Since the area of the front end 5a of the main magnetic pole layer 5 is sufficiently smaller than the area of the front end 4a of the auxiliary magnetic pole layer 4, magnetic flux Φ is concentrated in the front end 5a of the main magnetic pole layer 5, and magnetic data is written in the hard film Ma at the section facing the front end 5a by the magnetic flux Φ.

FIG. 28 is a partial front view of the perpendicular magnetic recording head shown in FIG. 27, viewed from the surface Ha. The main magnetic pole layer 5 is formed on a plating underlayer 5b composed of a magnetic material by plating using a magnetic material. The main magnetic pole layer 5 has a curved upper surface 5c in a convex form. In the conventional perpendicular magnetic recording head, sides 5d of the main magnetic pole layer 5 are perpendicular to the track width direction (the X direction in the drawing).

FIG. 29 is a plan view of a recording track on a recording medium in which signals have been written by the perpendicular magnetic recording head shown in FIGS. 27 and 28.

When the slider 1 moves between the outside periphery and the inside periphery, a skew angle may occur in which the sides 5d of the main magnetic pole layer 5 are inclined relative to a tangent of moving of the recording medium Md (the Y direction). If the sides 5d of the main magnetic pole layer 5 are perpendicular to the track width direction, when the sides 5d have a skew angle relative to the tangent of moving of the recording medium Md (the Y direction), the sides 5d of the main magnetic pole layer 5 apply an oblique leakage magnetic field to the outside of the track width Tw1 as illustrated by broken lines in FIG. 29, and fringing F is generated, resulting in a degradation in offtrack performance.

If the upper surface 5c of the main magnetic pole layer 5 is a curved surface in a convex form, domain boundaries B1 are curved and the pulse width of a regenerated waveform is increased. As a result, if the recording density is increased, it is not possible to obtain a clear distribution of recording magnetization. Therefore, it becomes difficult to increase the recording density in the longitudinal direction of the recording track (in the A direction).

SUMMARY OF THE INVENTION

Objects of the present invention are to provide a perpendicular magnetic recording head which can suppress fringing in a recorded pattern, which can improve the offtrack performance, and which can improve the recording density in the longitudinal direction of a recording track, and to provide a method for making the same.

In one aspect of the present invention, a perpendicular magnetic recording head includes an auxiliary magnetic pole layer exposed at a surface facing a recording medium; a main magnetic pole layer exposed at the surface facing the recording medium, the main magnetic pole layer being deposited on the auxiliary magnetic pole layer with an insulating layer therebetween; a coil layer for applying a recording magnetic field to the auxiliary magnetic pole layer and the main magnetic pole layer, the coil layer being provided toward the back from the surface facing the recording medium, wherein magnetic data is written in the recording medium by the magnetic field concentrating in the main magnetic pole layer perpendicular to the plane of the recording medium; and a connecting layer placed on the auxiliary magnetic pole layer toward the back from the surface facing the recording medium, the main magnetic pole layer and the connecting layer being magnetically coupled to each other directly or by a yoke layer formed on the main magnetic pole layer and on the connecting layer. At the surface facing the recording medium, the upper base of the main magnetic pole layer is wider than the lower base at the auxiliary magnetic pole layer side of the main magnetic pole layer so that the width in the track width direction of the main magnetic pole layer gradually increases with distance from the auxiliary magnetic pole layer.

In the present invention, at the surface facing the recording medium, the upper base of the main magnetic pole layer is wider than the lower base of the main magnetic pole layer so that the width in the track width direction of the main magnetic pole layer gradually increases with distance from the auxiliary magnetic pole layer. That is, at the surface facing the recording medium, the main magnetic pole layer has a substantially inverted trapezoidal front end.

Consequently, when writing is performed on the recording medium, even if the sides of the main magnetic pole layer have a skew angle relative to the tangent of moving of the recording medium, it is possible to prevent the sides from protruding from the recording track, and thus fringing can be avoided, resulting in an improvement in offtrack performance.

Preferably, in the present invention, at the surface facing the recording medium, the upper base of the main magnetic pole layer is linear.

The recording medium travels from the auxiliary magnetic pole layer side of the perpendicular magnetic recording head to the yoke layer side. Therefore, the shape of the magnetic boundaries of the recording track on the recording medium depends on the shape of the upper base of the main magnetic pole layer.

If the upper base of the main magnetic pole layer is linear, the magnetic boundaries of the recording track are also linear, and even if the recording density in the longitudinal direction of the recording track is increased, it is possible to obtain a clear distribution of recording magnetization, and thus satisfactory read/write characteristics can be obtained.

Preferably, in the present invention, the main magnetic pole layer is formed by plating on a plating underlayer composed of a nonmagnetic metallic material.

When the plating underlayer is composed of the nonmagnetic metallic material, the width in the track width direction of the plating underlayer may be larger than the width in the track width direction of the bottom of the main magnetic pole layer.

Preferably, in the present invention, the main magnetic pole layer is formed on a plating underlayer composed of a magnetic material, at least a part of the sides in the track width direction of the plating underlayer protrudes from either end in the track width direction of the lower base at the auxiliary magnetic pole layer side of the main magnetic pole layer, and the protrusion does not exceed a recording track width Tw1 written in the recording medium when a skew angle occurs during writing.

When the main magnetic pole layer is formed on the plating underlayer composed of the magnetic material, preferably, the width in the track width direction of the plating underlayer is smaller than the width in the track width direction of the lower base of the main magnetic pole layer.

If the width in the track width direction of the plating underlayer is in the range described above, when writing is performed on the recording medium, even if the sides of the main magnetic pole layer have a skew angle relative to the tangent of moving of the recording medium, it is possible to prevent the plating underlayer from protruding from the recording track, and thus fringing can be avoided.

Preferably, in the present invention, the area of a front end of the main magnetic pole layer exposed at the surface facing the recording medium is sufficiently smaller than the area of a front end of the auxiliary magnetic pole layer exposed at the surface facing the recording medium, and at a cross section parallel to the surface facing the recording medium, the cross-sectional area of the main magnetic pole layer is smaller than the cross-sectional area of the yoke layer.

Preferably, in the present invention, the saturation magnetic flux density of the main magnetic pole layer is higher than the saturation magnetic flux density of the yoke layer.

Preferably, a front end of the yoke layer is placed toward the back from the surface facing the recording medium.

In another aspect of the present invention, a method for making a perpendicular magnetic recording head includes:

a step (a) of forming an auxiliary magnetic pole layer using a magnetic material;

a step (b) of forming a connecting layer on the auxiliary magnetic pole layer using a magnetic material toward the back from a surface facing a recording medium;

a step (c) of forming a coil layer in a region toward the back from the surface facing the recording medium;

a step (d) of depositing an insulating layer on the auxiliary magnetic pole layer and forming a plating underlayer on the insulating layer;

a step (e) of forming a resist layer on the plating underlayer and forming a recess in the resist layer at a section for forming the surface facing the recording medium, the inner width in the track width direction of the recess gradually increasing with distance from the auxiliary magnetic pole layer, the recess having a predetermined depth toward the back from the surface facing the recording medium;

a step (f) of forming a main magnetic pole layer by plating in the recess and then removing the resist layer; and a step (g) of magnetically coupling the main magnetic pole layer and the connecting layer to each other directly or by forming a yoke layer on the main magnetic pole layer and on the connecting layer.

In the method for making the perpendicular magnetic recording head of the present invention, in step (e), a recess is formed in the resist layer so that the inner width in the track width direction of the recess gradually increases with distance from the auxiliary magnetic pole layer and the recess has a predetermined depth toward the back from the surface facing the recording medium. In step (f), a main magnetic pole layer is formed by plating in the recess.

That is, in the main magnetic pole layer of the perpendicular magnetic recording head thus obtained, at the surface facing the recording medium, the upper base of the main magnetic pole layer is wider than the lower base at the auxiliary magnetic pole layer side of the main magnetic pole layer so that the width in the track width direction gradually increases with distance from the auxiliary magnetic pole layer. That is, the main magnetic pole layer has a substantially inverted trapezoidal front end.

In step (e), in order to form the recess so that the inner width in the track width direction gradually increases with distance from the auxiliary magnetic pole layer, in step (e), preferably, the resist layer is formed on the plating underlayer and the recess is formed by patterning in the resist layer, and then the resist layer is heat-treated.

Alternatively, in step (e), preferably, the resist layer is formed on the plating underlayer and the recess is formed by patterning in the resist layer by adjusting the patterning accuracy of the resist layer so that the inner width in the track width direction gradually increases with distance from the auxiliary magnetic pole layer.

In the present invention, the method may further include, between step (f) and step (g), a step (h) of planarizing the upper surface of the main magnetic pole layer by milling, wherein milling particles are emitted at a predetermined angle with respect to the center line of the main magnetic pole layer. By planarizing the upper surface of the main magnetic pole layer, at the surface facing the recording medium, the upper base of the main magnetic pole layer is set to be linear.

The method may further include, between step (f) and step (g), a step (i) of etching the sides of the main magnetic pole layer by milling to set the width in the track width direction of the main magnetic pole layer, wherein milling particles are emitted at a predetermined angle with respect to the center line of the main magnetic pole layer.

The method may further include, between step (f) and step (g), a step (j) of removing the plating underlayer in a region other than the region underlying the main magnetic pole layer by milling, wherein milling particles are emitted at a predetermined angle with respect to the center line of the main magnetic pole layer, and then removing the material of the plating underlayer adhering to the sides of the main magnetic pole layer by the milling.

In the present invention, the method may further include, between step (f) and step (g), a step (k) of planarizing the upper surface of the main magnetic pole layer by milling, wherein milling particles are emitted at a predetermined angle with respect to the center line of the main magnetic pole layer, and then performing the removal of the plating underlayer in a region other than the region underlying the main magnetic pole layer, the removal of the material of the plating underlayer adhering to the sides of the main magnetic pole layer, and etching of the sides of the main magnetic pole layer to set the width in the track width direction of the main magnetic pole layer simultaneously by the milling.

Preferably, in step (h), (i), (j), or (k), the predetermined angle is 45° to 80°. More preferably, the predetermined angle is 60° to 70°.

In step (d), the plating underlayer may be formed using a magnetic material or a nonmagnetic material.

If the plating underlayer is composed of a nonmagnetic material, even if the unwanted plating underlayer remains in a region other than the region underlying the main magnetic pole layer when the unwanted plating underlayer is removed after the formation of the main magnetic pole layer, the recording characteristics of the perpendicular magnetic recording head are not greatly affected.

Consequently, if the plating underlayer is composed of the nonmagnetic material, when the plating underlayer is removed in the region other than the region underlying the main magnetic pole layer in step (j) or (k), the width in the track width direction of the plating underlayer may be set larger than the width in the track width direction of the bottom of the main magnetic pole layer.

BRIEF DESCRIPTION OF THE DRAWINGS

FIGS. 11A and 11B show a step in the method for fabricating the perpendicular magnetic recording head, wherein FIG. 11A is a cross-sectional view and FIG. 11B is a top plan view;

FIGS. 12A and 12B show a step in the method for fabricating the perpendicular magnetic recording head, wherein FIG. 12A is a cross-sectional view and FIG. 12B is a top plan view;

FIGS. 16A and 16B show a step in the method for fabricating the perpendicular magnetic recording head, wherein FIG. 16A is a cross-sectional view and FIG. 16B is a top plan view;

DESCRIPTION OF THE PREFERRED EMBODIMENTS

Figure 1:
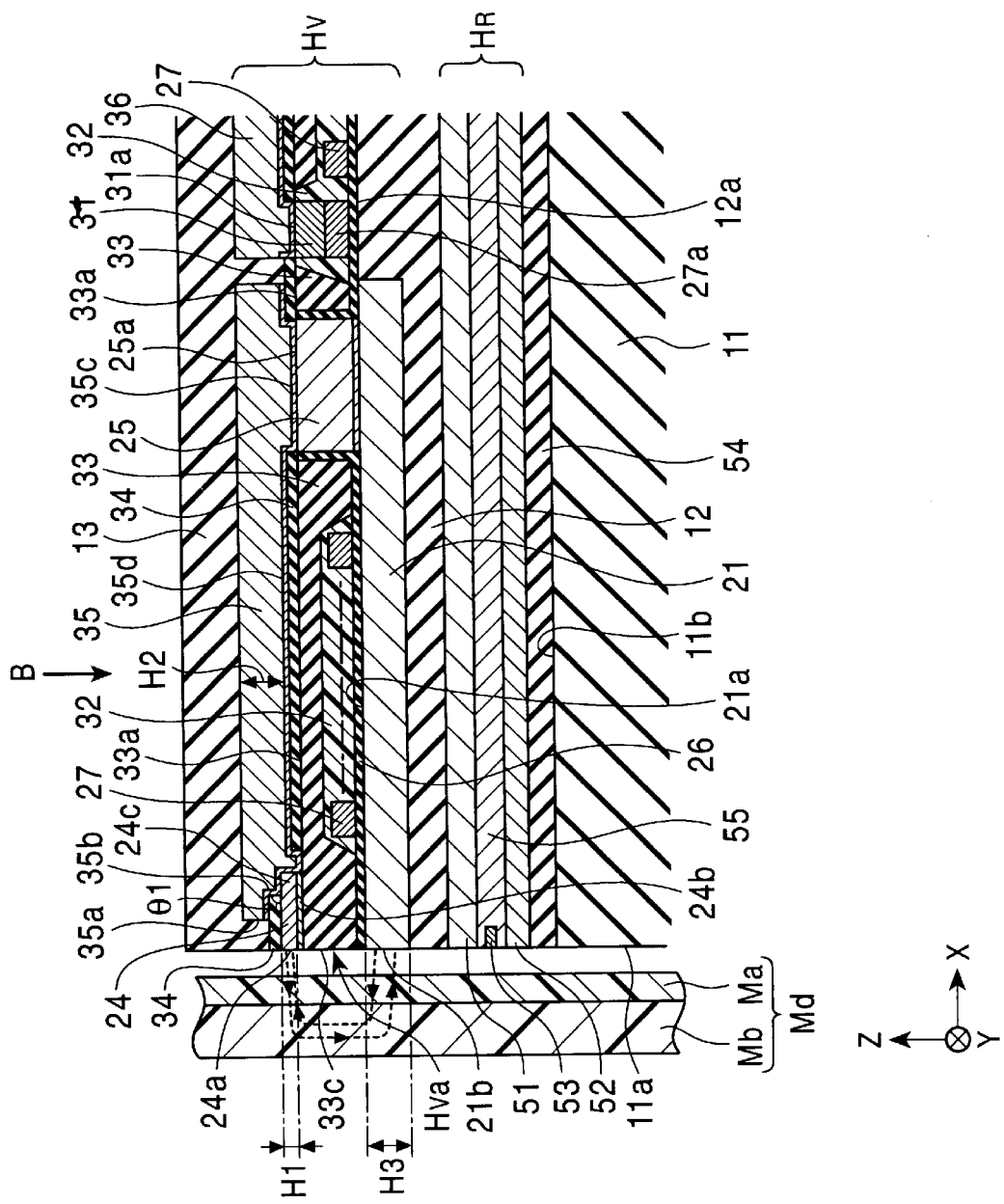
FIG. 1 is a sectional view showing a state in which a perpendicular magnetic recording head in an embodiment of the present invention faces a recording magnetic medium.
Figure 2:
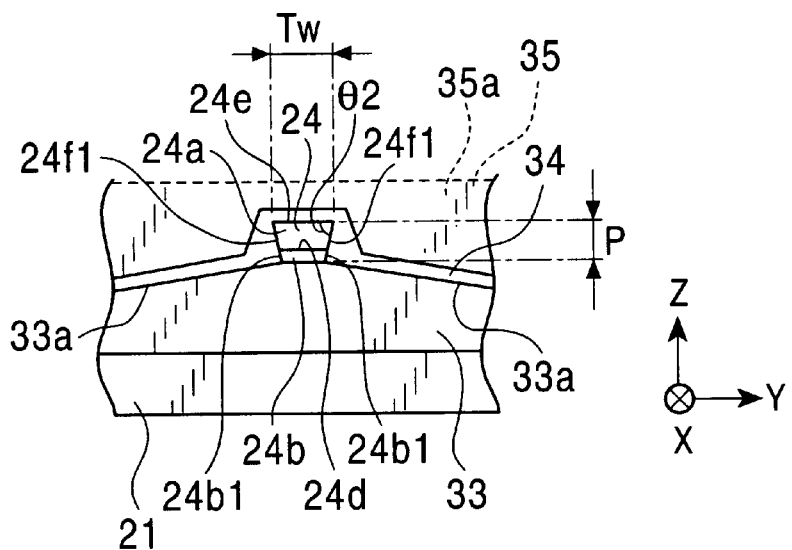
FIG. 2 is a front view of the perpendicular magnetic recording head shown in FIG. 1, viewed from the surface facing the recording medium.

FIG. 1 is a longitudinal sectional view of a perpendicular magnetic recording head in an embodiment of the present invention, and FIG. 2 is a front view of the perpendicular magnetic recording head shown in FIG. 1, viewed from the surface facing a recording medium.

A perpendicular magnetic recording head Hv shown in FIG. 1 applies a perpendicular magnetic field to a recording medium Md to magnetize a hard film Ma of the recording medium Md in the perpendicular direction.

The recording medium MD, which is a disk provided with a hard film Ma having a high remanence on the surface and a soft film Mb having a high magnetic permeability inside, rotates about the center of the disk as the rotation axis.

A slider 11 for the perpendicular magnetic recording head Hv is composed of a nonmagnetic material, such as $Al_2O_3 \cdot TiC$, and a surface 11a of the slider 11 faces the recording medium Md. When the recording medium Md rotates, the slider 11 floats from the surface of the recording medium Md because of an airflow occurring on the surface, or the slider 11 slides over the recording medium Md. The perpendicular magnetic recording head Hv is provided on a trailing edge 11b of the slider 11. In FIG. 1, the recording medium Md moves in the Z direction relative to the slider 11.

A nonmagnetic insulating layer 54 composed of an inorganic material, such as $Al_2O_3$ or $SiO_2$, is formed on the trailing edge 11b of the slider 11, and a read section HR is formed on the nonmagnetic insulating layer 54.

The read section $H_R$ includes a lower shield layer 52, a gap layer 55, a magnetoresistive element 53, and an upper shield layer 51 deposited in that order on the nonmagnetic insulating layer 54. Examples of the magnetoresistive element 53 include an anisotropic magnetoresistive (AMR) element, a giant magnetoresistive (GMR) element, and a tunnel magnetoresistive (TMR) element.

A nonmagnetic insulating layer 12 composed of an inorganic material, such as $Al_2O_3$ or $SiO_2$, is formed on the upper shield layer 51, and the perpendicular magnetic recording head Hv for writing in accordance with the present invention is provided on the nonmagnetic insulating layer 12. The perpendicular magnetic recording head Hv is covered by a protective layer 13 composed of an inorganic nonmagnetic insulating material or the like. A surface Hva of the perpendicular magnetic recording head Hv and the surface 11a of the slider 11 are substantially level with each other.

In the perpendicular magnetic recording head Hv, an auxiliary magnetic pole layer 21 is formed by plating of a ferromagnetic material, such as Permalloy (NiFe). The auxiliary magnetic pole layer 21 is a so-called return path layer. The nonmagnetic insulating layer 12 is formed under the auxiliary magnetic pole layer 21 (between the auxiliary magnetic pole layer 21 and the trailing edge 11b of the slider 11) and in the periphery of the auxiliary magnetic pole layer 21. As shown in FIG. 1, an upper surface 21a of the auxiliary magnetic pole layer 21 and an upper surface 12a of the nonmagnetic insulating layer 12 are on the same level.

As shown in FIG. 1, a connecting layer 25 composed of NiFe or the like is formed on the surface 21a of the auxiliary magnetic pole layer 21 toward the back from the surface Hva (in the height direction; in the X direction).

A nonmagnetic insulating layer 26 composed of $Al_2O_3$ or the like is formed on the surface 21a of the auxiliary magnetic pole layer 21 and on the surface 12a of the nonmagnetic insulating layer 12 around the connecting layer 25. A coil layer 27 composed of a conductive material, such as Cu, is formed on the nonmagnetic insulating layer 26. The coil layer 27 is formed by frame plating or the like, and has a planar spiral pattern so as to have a predetermined number of turns. An elevating layer 31 composed of a conductive material, such as Cu, is formed on a connection end 27a in the winding center of the coil layer 27.

The coil layer 27 and the elevating layer 31 are covered by an insulating layer 32 composed of an organic material, such as a resist, which is further covered by an insulating layer 33.

The insulating layer 33 is preferably composed of at least one inorganic insulating material selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

An upper surface 25a of the connecting layer 25, an upper surface 31a of the elevating layer 31, and an upper layer 33a of the insulating layer 33 are machined so as to be on the same level. Such a planarization process is performed by chemical mechanical polishing (CMP) or the like.

In this embodiment, a main magnetic pole layer 24 composed of NiFe is formed on the insulating layer 33, and a front end 24a of the main magnetic pole layer 24 and the surface Hva are on the same level. The main magnetic pole layer 24 is formed by plating on a plating underlayer 24b composed of NiFe.

A yoke layer 35 composed of NiFe or the like is formed on the insulating layer 33 with an inorganic insulating layer 34 composed of $Al_2O_3$ therebetween. The yoke layer 35 is formed by plating on a plating underlayer 35d composed of NiFe. As shown in FIG. 1, a back section 24c of the main magnetic pole layer 24 and a front section 35b of the yoke layer 35 are magnetically coupled to each other, and a base 35c of the yoke layer 35 is magnetically coupled to the upper surface 25a of the connecting layer 25.

The main magnetic pole layer 24 may be extended in the height direction such that the back section of the main magnetic pole layer 24 is magnetically coupled to the upper surface 25a of the connecting layer 25, and the yoke layer 35 may be formed on the main magnetic pole layer 24.

A front end 35a of the yoke layer 35 is located toward the back from the surface Hva in the height direction, being embedded in the protective layer 13, and is not exposed at the surface Hva.

In this embodiment, a thickness H2 of the yoke layer 35 is larger than a thickness H1 of the main magnetic pole layer 24.

The front end 35a is perpendicular to the height direction (the X direction in the drawing). However, the front end 35 may have an inclined surface or a curved surface in which the depth in the height direction gradually increases from the lower surface to the upper surface. An external angle θ1 between the upper surface of the main magnetic pole layer 24 formed below the yoke layer 35 and the front end 35a of the yoke layer 35 is preferably 90° or more. Consequently, a leakage magnetic field from the main magnetic pole layer 24 to the yoke layer 35 can be decreased and the magnetic field can be further concentrated in the main magnetic pole layer 24.

As shown in FIG. 1, a lead layer 36 is formed on the surface 31a of the elevating layer 31, and a recording current can be applied from the lead layer 36 to the elevating layer 31 and the coil layer 27. Additionally, the lead layer 36 may be composed of the same material as that for the yoke layer 35, and the yoke layer 35 and the lead layer 36 can be simultaneously formed by plating. The yoke layer 35 and the lead layer 36 are covered by the protective layer 13 composed of $Al_2O_3$.

As shown in FIG. 2, in the main magnetic pole layer 24 exposed at the surface Hva, an upper base 24e (the trailing side) is wider than a lower base 24d (the auxiliary magnetic pole layer 21 side) so that the width in the track width direction (in the Y direction in the drawing) gradually increases with distance from the auxiliary magnetic pole layer 21. That is, at the surface Hva, the main magnetic pole layer 24 has an inverted trapezoidal front end. Although sides 24f1 of the main magnetic pole layer 24 are linear in FIG. 2, the sides 24f1 may be curved.

The main magnetic pole layer 24 is covered by the inorganic insulating layer 34 and the protective layer 13.

The track width Tw of the perpendicular magnetic recording head shown in FIGS. 1 and 2 is defined by the width of the upper base 24e. In the present invention, the track width Tw can be set at 0.5 μm or less, and furthermore at 0.3 μm or less. A pole length P which is the sum of the height of the plating underlayer 24b and the height of the main magnetic pole layer 24 is 0.2 to 0.45 μm. The thickness of the plating underlayer 24b is 15 to 50 nm.

In this embodiment, the plating underlayer 24b is composed of a magnetic material, such as NiFe or Ni. The sides 24f1 of the main magnetic pole layer 24 and sides 24b1 of the plating underlayer 24b form continuous straight lines or curved lines. That is, the width in the track width direction (in the Y direction) of the plating underlayer 24b also gradually increases with distance from the auxiliary magnetic pole layer 21, and the plating underlayer 24b and the main magnetic pole layer 24 have a substantially inverted trapezoidal shape at the surface Hva. Consequently, even when the plating underlayer 24b is composed of the magnetic material, it is possible to prevent the recording track pattern on the recording medium from being disturbed by a leakage magnetic field from the plating underlayer 24b.

Figure 22:
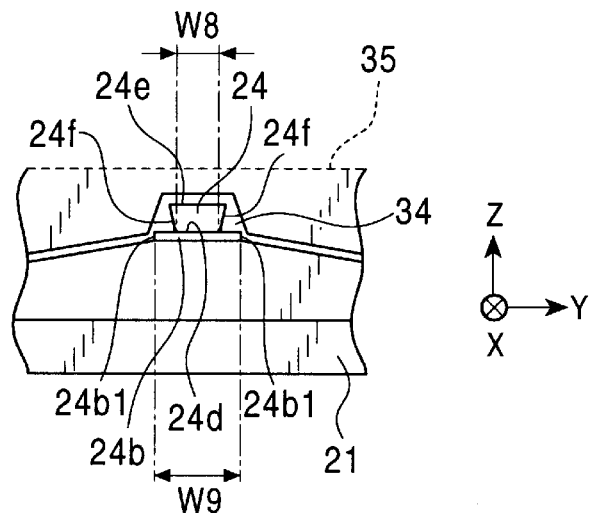
FIG. 22 is a front view of a perpendicular magnetic recording head in another embodiment of the present invention, viewed from the surface facing a recording medium.

The plating underlayer 24b may be composed of a nonmagnetic material, such as Cu, Au, Pd, Rh, Ru, Pt, NiLu, NiP, NiPd, NiW, NiB, NiMo, Ir, NiCu, NiCr, Cr, or Ti. When the plating underlayer 24b is composed of a nonmagnetic material, even if the sides 24f1 of the main magnetic pole layer 24 and the sides 24b1 of the plating underlayer 24b do not form continuous straight lines or curved lines, for example, as shown in FIG. 22, even if a width W9 (width in the track width direction) of the plating underlayer 24b is larger than a width W8 (width in the track width direction) of the lower base 24d of the main magnetic pole layer 24, it is possible to prevent the recording track pattern on the recording medium from being disturbed.

In this embodiment, the upper base 24e of the main magnetic pole layer 24 is linear at the surface Hva.

As shown in FIG. 2, the upper surface 33a of the insulating layer 33 formed at either side of the lower surface of the main magnetic pole layer 24 inclines downward from the main magnetic pole layer 24. This is because of etching performed to remove the unwanted plating underlayer 24b formed on the insulating layer 33 other than the region beneath the main magnetic pole layer 24. The upper surface 33a of the insulating layer 33 may be curved downward from the main magnetic pole layer 24.

An angle θ2 between the upper base 24e and the side 24f1 of the main magnetic pole layer 24 is preferably 60° to less than 90°, and more preferably 60° to 80°.

Figure 3:
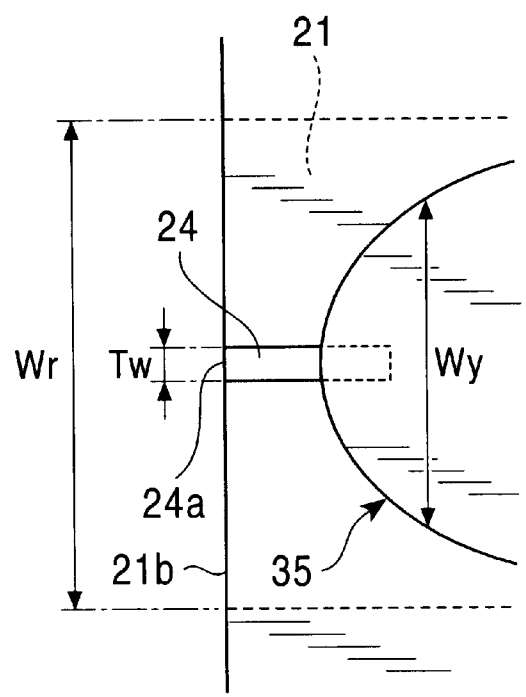
FIG. 3 is a top plan view of the perpendicular magnetic recording head shown in FIG. 1, viewed from the B direction.

As shown in FIG. 3, a width Wy of the yoke layer 35 gradually increases in the height direction, and a part of the yoke layer 35 overlies the main magnetic pole layer 24.

Figure 4:
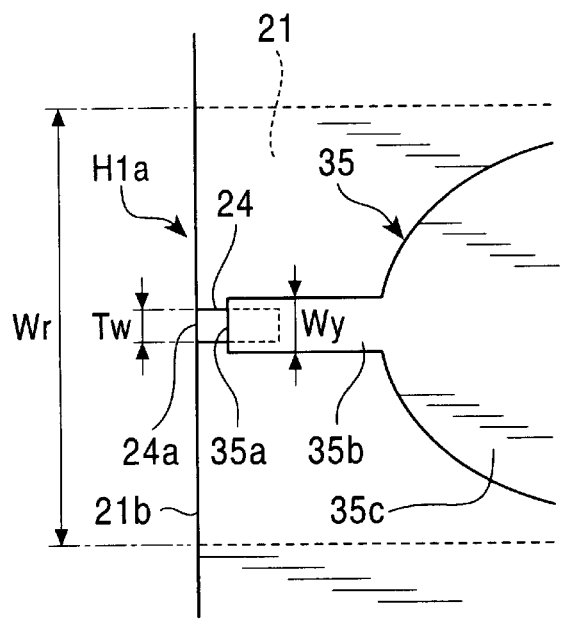
FIG. 4 is a top plan view of a perpendicular magnetic recording head in another embodiment of the present invention.

Alternatively, as shown in FIG. 4, a front region 35b of the yoke layer 35 may have a small width Wy, and the width in the track width direction of a back region 35c of the yoke layer 35 may gradually increase in the height direction, the front region 35b overlapping the main magnetic pole layer 24.

Figure 5:
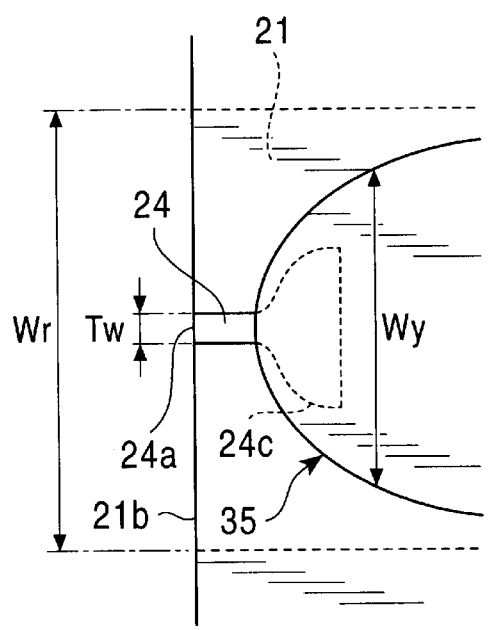
FIG. 5 is a top plan view of a perpendicular magnetic recording head in another embodiment of the present invention.

Alternatively, as shown in FIG. 5, the width of a back region 24c of the main magnetic pole layer 24 may gradually increase in the height direction, and the yoke layer 35 may overlie the back region 24c.

If the main magnetic pole layer 24 has a shape in which the width of the back region 24c gradually increases as shown in FIG. 5, the flowing efficiency of flux from the yoke layer 35 to the main magnetic pole layer 24 is increased, resulting in an improvement in the overwrite characteristic. Additionally, as shown in FIG. 5, if the wide back region 24 of the main magnetic pole layer 24 is completely covered by the yoke layer 35, the flow efficiency of flux from the yoke layer 35 to the main magnetic pole layer 24 is further increased in comparison with the case in which the back region 24c protrudes from the front of the yoke layer 35. The back region 24c may be extended in the height direction so that the connecting layer 25 and the main magnetic pole layer 24 are directly magnetically coupled to each other, and the yoke layer 35 may be omitted.

In any one of the structures shown in FIGS. 3 to 5, the width Tw in the track width direction of the front end 24a of the main magnetic pole layer 24 exposed at the surface Hva is sufficiently smaller than the width Wr in the track width direction of the front end 21b of the auxiliary magnetic pole layer 21 exposed at the surface HVa. As shown in FIG. 1, the thickness H1 of the main magnetic pole layer 24 is smaller than a thickness H3 of the auxiliary magnetic pole layer 21. Consequently, the area of the front end 24a of the main magnetic pole layer 24 exposed at the surface Hva is sufficiently smaller than the area of the front end 21b of the auxiliary magnetic pole layer 21. The thickness H1 of the main magnetic pole layer 24 is smaller than the thickness H2 of the yoke layer 35.

A cross-sectional area of the main magnetic pole layer 24 is smaller than a cross-sectional area of the back region of the yoke layer 35 when taken along a surface parallel to the surface Hva.

Preferably, the main magnetic pole layer 24 is composed of a magnetic material having a higher saturation magnetic flux density $B_s$ than the yoke layer 35.

In the perpendicular magnetic recording head Hv, when a recording current is applied to the coil layer 27 through the lead layer 36, a recording magnetic field is induced to the auxiliary magnetic pole layer 21 and the yoke layer 35 by a current magnetic field generated by the current flowing through the coil layer 27. As shown in FIG. 1, a leakage recording magnetic field between the front end 24a of the main magnetic pole layer 24 and the front end 21b of the auxiliary magnetic pole layer 21 penetrates the hard film Ma of the recording medium Md and passes through the soft film Mb. Since the area of the front end 24a of the main magnetic pole layer 24 is sufficiently smaller than the area of the front end 21b of the auxiliary magnetic pole layer 21, magnetic flux Φ of the leakage recording magnetic field is concentrated in the front end 24a of the main magnetic pole layer 24, and the hard film Ma is magnetized perpendicularly by the concentrated magnetic flux Φ, and thus magnetic data is recorded. The magnetic flux density of the hard film Ma is saturated by the leakage recording magnetic field produced from or absorbed by the front end 24a of the main magnetic pole layer 24, and the hard film Ma is not greatly magnetized by the leakage recording magnetic field produced from or absorbed by the front end 21b of the auxiliary magnetic pole layer 21.

In the perpendicular magnetic recording head Hv, since the main magnetic pole layer 24 and the yoke layer 35 are separately formed, the width Tw in the track width direction and the thickness H1 of the main magnetic pole layer 24 can be set separately from the width Wy and the thickness H2 of the yoke layer 35. Consequently, the width Tw of the main magnetic pole layer 24 can be decreased, and recording in narrowed tracks is enabled. Moreover, since the yoke layer 35 can be formed so as to have a sufficiently large sectional area, most of the recording magnetic field induced by the coil layer 27 can be guided from the yoke layer 35 to the main magnetic pole layer 24.

If the main magnetic pole layer 24 is composed of a magnetic material having a higher saturation magnetic flux density than the yoke layer 35, it is possible to apply the magnetic flux Φ with a high density to the hard film Ma from the main magnetic pole layer 24 having the small width Tw and the small thickness H1, and thus the overwrite characteristic is improved.

Figure 6:
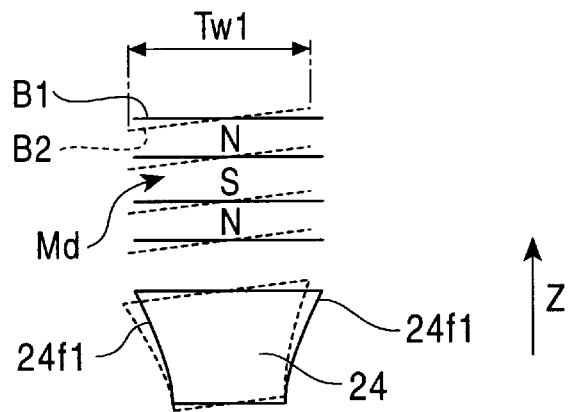
FIG. 6 is a schematic diagram showing a state in which a skew angle occurs in a perpendicular magnetic recording head of the present invention.

FIG. 6 is a plan view of a recording track on a recording medium in which signals have been recorded by the perpendicular magnetic recording head shown in FIGS. 1 and 2.

When the slider 11 moves between the outside periphery and the inside periphery of the disk-shaped recording medium Md, a skew angle may occur in which the sides 24f1 of the main magnetic pole layer 24 are inclined relative to a tangent of rotation of the recording medium Md (the Z direction in the drawing). As shown in FIG. 2, in the main magnetic pole layer 24 exposed at the surface Hva, the upper base 24e is wider than the lower base 24d of the main magnetic pole layer 24 so that the width in the track width direction gradually increases with the distance from the auxiliary magnetic pole layer 21, i.e., the main magnetic pole layer 24 has a substantially inverted trapezoidal front end.

Consequently, when the sides 24f1 of the main magnetic pole layer 24 have a skew angle relative to the tangent of rotation of the magnetic recording medium (the Z direction), as illustrated by broken lines, the sides 24f1 do not greatly protrude from the recording track width Tw1. Therefore, fringing due to the sides 24f1 can be prevented, resulting in an improvement in offtrack performance.

Since the upper base 24e of the main magnetic pole layer 24 is linear, a magnetic boundary B1 or B2 on the recording track is also linear, and the pulse width of a regenerated waveform is decreased, and thus it is possible to obtain a clear distribution of recording magnetization even when the recording density is increased. Consequently, the recording density in the longitudinal direction (in the Z direction) of the recording track is easily increased.

A method for fabricating the perpendicular magnetic recording head shown in FIGS. 1 to 3 will be described below. FIGS. 7 to 10 are longitudinal sectional views of the perpendicular magnetic head, showing steps in the fabrication method.

Figure 7:
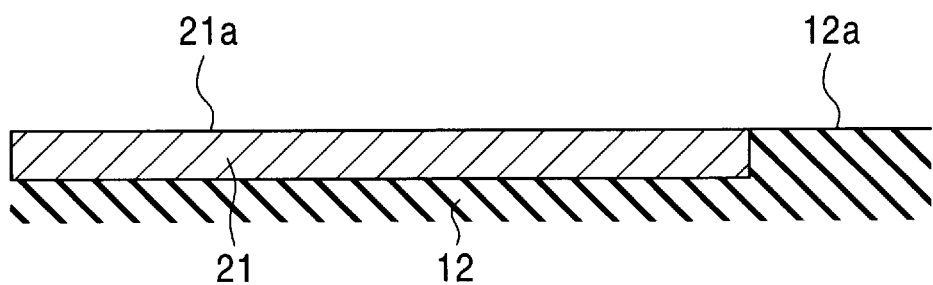
FIG. 7 is a longitudinal sectional view showing a step in a method for fabricating a perpendicular magnetic recording head.

In a step shown in FIG. 7, an auxiliary magnetic pole layer 21 composed of a magnetic material is formed on a nonmagnetic insulating layer 12, and the back in the height direction of the auxiliary magnetic pole layer 21 is also filled with the nonmagnetic insulating layer 12, and then the upper surfaces of the auxiliary magnetic pole layer 21 and the nonmagnetic insulating layer 12 are planarized using CMP or the like.

Figure 8:
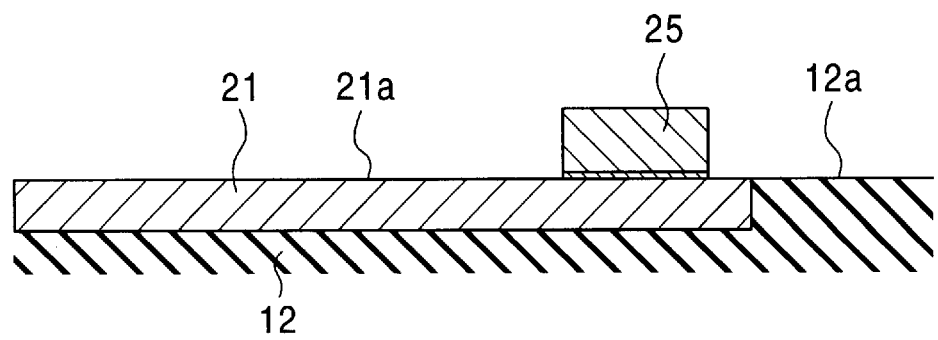
FIG. 8 is a longitudinal sectional view showing a step in the method for fabricating the perpendicular magnetic recording head.

Next, as shown in FIG. 8, a connecting layer 25 composed of a magnetic material is formed by plating at the back in the height direction of the auxiliary magnetic pole layer 21. The connecting layer 25 may be formed after a coil layer 27 which will be described below is formed.

Figure 9:
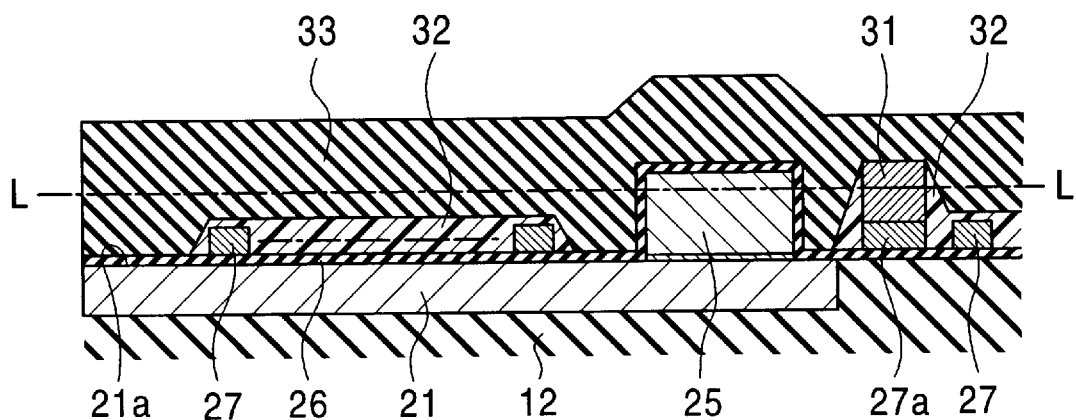
FIG. 9 is a longitudinal sectional view showing a step in the method for fabricating the perpendicular magnetic recording head.

Next, as shown in FIG. 9, a nonmagnetic insulating layer 26 is formed over the upper surface 21a of the auxiliary magnetic pole layer 21 and the upper surface of the connecting layer 25 by sputtering an inorganic insulating material. Furthermore, a coil layer 27 is formed on the nonmagnetic insulating layer 26 by a frame plating method, using a conductive material, such as Cu, and an elevating layer 31 is also formed by plating. At this stage, the coil layer 27 is sufficiently lower than the connecting layer 25. The coil layer 27 and the elevating layer 31 are covered by an organic insulating layer 32, and then an insulating layer 33 for covering all the layers is formed by sputtering an inorganic insulating material.

Next, grinding is performed, using CMP or the like, on the individual layers formed, from the upper side as shown in FIG. 9. The grinding is performed down to a horizontal plane (L—L plane) which cross all of the insulating layer 33, the connecting layer 25, and the elevating layer 31.

Figure 10:
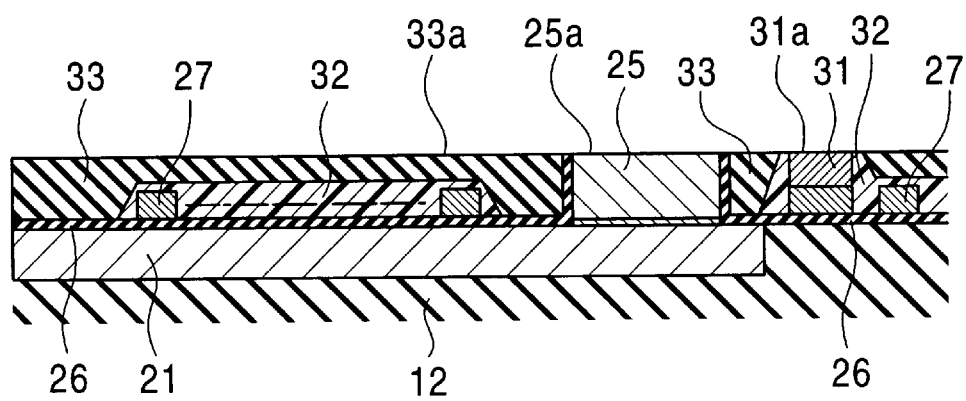
FIG. 10 is a longitudinal sectional view showing a step in the method for fabricating the perpendicular magnetic recording head.

As a result of the grinding, the surface 25a of the connecting layer 25, the surface 33a of the insulating layer 33, and the surface 31a of the elevating layer 31 are on the same level as shown in FIG. 10.

Next, a method for making a main magnetic pole layer of the perpendicular magnetic recording head shown in FIGS. 1 to 3 will be described. FIGS. 11B and 12B are top plan views showing a main magnetic pole layer-forming section, and FIGS. 11A and 12A are cross-sectional views, taken along the line XIA—XIA of FIG. 11B and the line XIIA—XIIA of FIG. 12B, respectively.

Figure 11A:
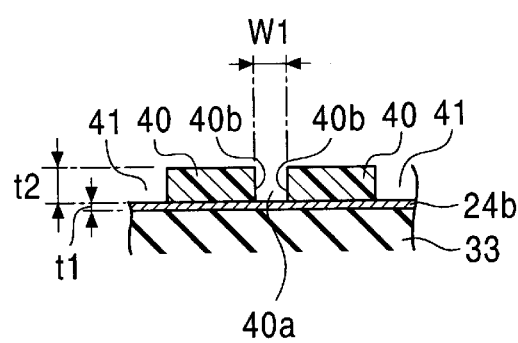
Figure 11B:
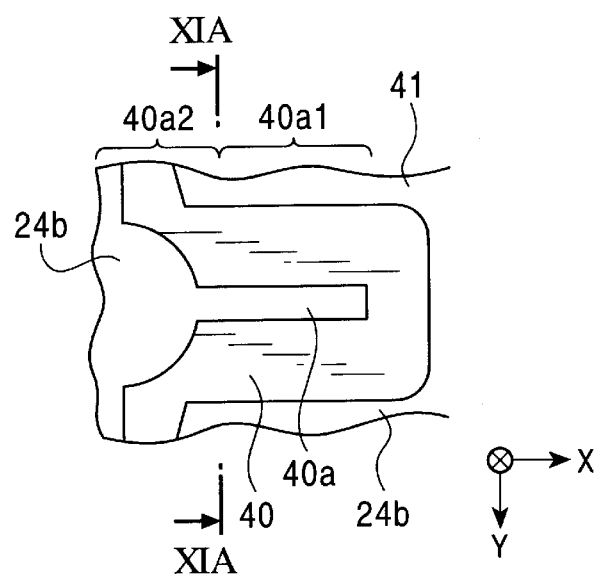
Figure 12A:
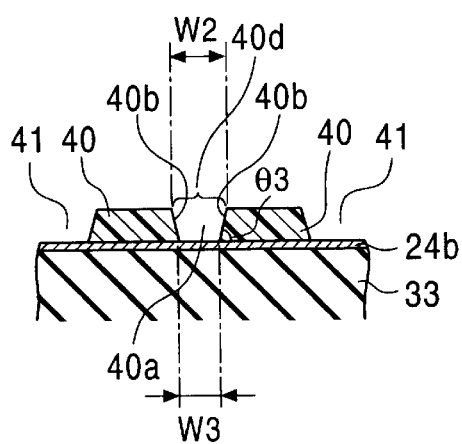
Figure 12B:
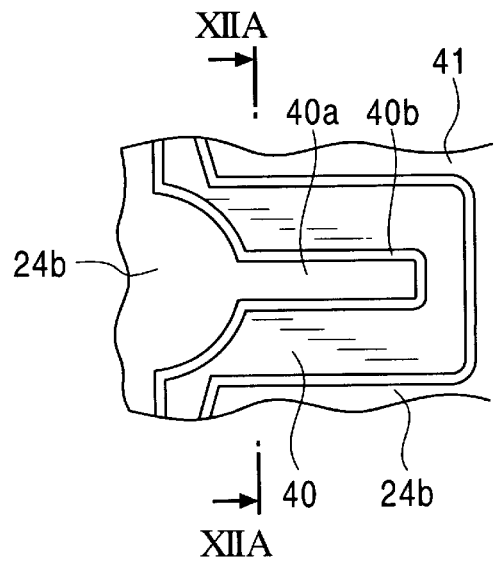

In a step shown in FIGS. 11A and 11B, a plating underlayer 24b is formed over the upper surface 33a of the insulating layer 33, the upper surface 25a of the connecting layer 25, and the upper surface 31a of the elevating layer 31, and a resist layer 40 is formed over the upper surface of the plating underlayer 24b. A recess 40a which corresponds to a pattern for forming a main magnetic pole layer 24 is made in the resist layer 40 by exposure/development at a surface facing a recording medium so as to have a predetermined depth from the surface. The recess 40a includes a recess 40a2 for storing plating in which the width (in the Y direction) increases in the leftward direction and a recess 40a1 for forming a magnetic pole. A section outside the resist layer 40 in which the plating underlayer 24b is exposed is a dummy-forming section 41 for forming a dummy plating layer.

The plating underlayer 24b is composed of NiFe with a thickness t1 of 50 nm. Alternatively, a plating underlayer 24b of Cr/Cu may be formed. The plating underlayer 24b may be composed of a magnetic material, such as Ni, or a nonmagnetic material, such as Cu, Au, Pd, Rh, Ru, Pt, NiLu, NiP, NiPd, NiW, NiB, NiMo, Ir, NiCu, NiCr, Cr, or Ti.

A resist thickness t2 of the resist layer 40 is 1 to 2 $\mu$m. A width W1 in the track width direction of the recess 40a is 0.35 to 0.6 $\mu$m.

After the recess 40a is made, the resist layer 40 is heat-treated, and the sides 40b of the recess 40a are formed into inclined surfaces or curved surfaces. That is, the inner width in the track width direction of the recess 40a is set to increase with distance from the auxiliary magnetic pole layer 21. In FIG. 12A, the sides 40b of the recess 40a are inclined surfaces.

An angle $\theta 3$ between the surface of the plating underlayer 24b and the side 40b of the resist layer 40 after the heat treatment is preferably 60° to less than 90°, and more preferably 60° to 80°. In this embodiment, the angle $\theta 3$ is 65°. By defining the angle $\theta 3$, a tapering angle of the side of the resulting main magnetic pole layer 24 can be defined. A width W3 in the track width direction of the bottom face of the recess 40a is 0.35 to 0.60 $\mu$m.

Figure 13:
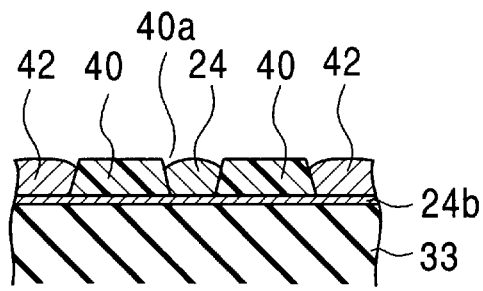
FIG. 13 is a cross-sectional view showing a step in the method for fabricating the perpendicular magnetic recording head.

FIG. 13 is a cross-sectional view showing a state in which layers are formed by plating in the recess 40 and on the dummy-forming section 41 using a magnetic material, such as NiFe. The main magnetic pole layer 24 is formed in the recess 40 and a dummy plating layer 42 is formed on the dummy-forming section 41. By forming the dummy plating layer 42, the quality of plating can be improved. When plating is performed, a pulsed plating method is used. Additionally, the dummy-forming section 41 and the dummy plating layer 42 may be omitted.

Figure 14:
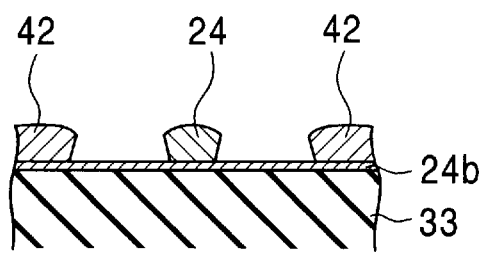
FIG. 14 is a cross-sectional view showing a step in the method for fabricating the perpendicular magnetic recording head.
Figure 15:
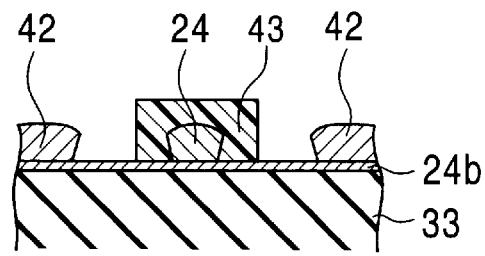
FIG. 15 is a cross-sectional view showing a step in the method for fabricating the perpendicular magnetic recording head.
Figure 16A:
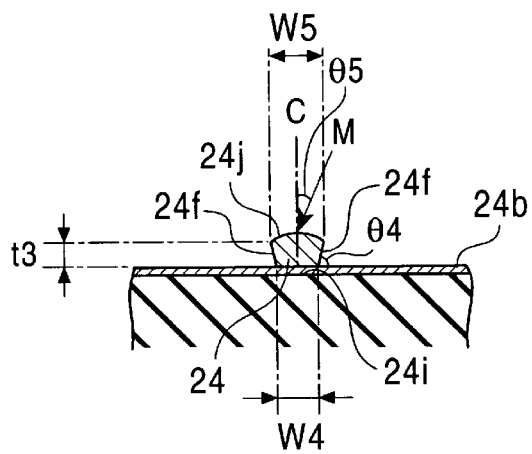
Figure 16B:
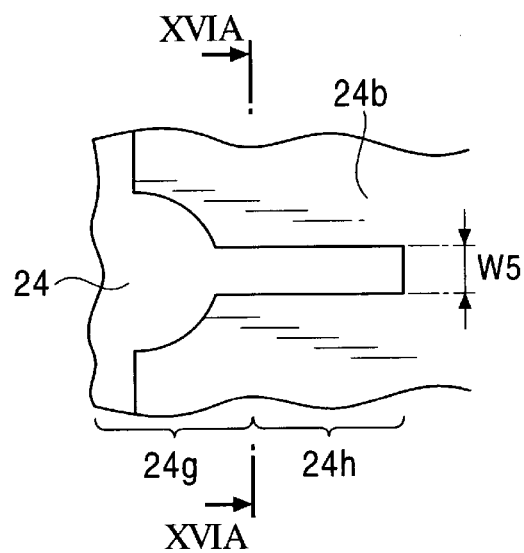

After the main magnetic pole layer 24 and the dummy plating layer 42 are formed, the resist layer 40 is removed as shown in FIG. 14. Next, as shown in FIG. 15, the main magnetic pole layer 24 is covered by a resist layer 43, and the dummy plating layer 42 is removed by etching. FIG. 16B is a top plan view of the main magnetic pole layer 24 and its vicinity after the dummy plating layer 42 is removed, and FIG. 16A is a cross-sectional view taken along the line XVIA—XVIA of FIG. 16B. FIG. 16A shows the shape of the main magnetic pole layer 24 immediately after the formation by plating. The main magnetic pole layer 24 immediately after the formation by plating includes a plating-storing section 24g in which the inner width increases leftward and a magnetic pole-forming section 24h in which the inner width remains uniform. If the plating-storing section 24g is formed, a uniform main magnetic pole layer 24 is easily formed by plating. Additionally, the plating-storing section 24g is removed by grinding in the subsequent process, and is not present in a finished perpendicular magnetic recording head. That is, only the magnetic pole-forming section 24h constitutes the main magnetic pole layer 24 of the finished perpendicular magnetic recording head. The surface taken along the line XVIA—XVIA corresponds to the surface facing a recording medium of the finished perpendicular magnetic recording head.

A width W4 of the lower face 24i of the magnetic pole-forming section 24h of the main magnetic pole layer 24 immediately after the formation by plating is 0.60 $\mu$m, a width W5 of the upper face 24j is 0.96 $\mu$m, and a height t3 is 0.96 $\mu$m. The upper face 24j immediately after the formation by plating is a curved surface having a rise in the center as shown in FIG. 16A.

An angle $\theta 4$ between the side 24f of the main magnetic pole layer 24 and the plating underlayer 24b shown in FIG. 16A is equal to the angle $\theta 3$ between the side 40b of the resist layer 40 and the plating underlayer 24b, and also is equal to the angle $\theta 2$ (tapering angle) between the upper base 24e and the side 24f1 of the main magnetic pole layer 24 shown in FIG. 2.

Next, anisotropic ion milling is performed in which milling particles M are emitted at a predetermined angle $\theta 5$ with respect to the center line C in the longitudinal direction of the main magnetic pole layer 24 as shown in FIG. 16A.

By planarizing the upper face 24j of the main magnetic pole layer 24 by ion milling obliquely with respect to the center line C in the longitudinal direction of the main magnetic pole layer 24, it is possible to simultaneously perform the removal of the plating underlayer 24b in the region other than the region underlying the main magnetic pole layer 24, the removal of the material for the plating underlayer 24b adhering to the sides 24f of the main magnetic pole layer 24 when the plating underlayer 24 is removed, and the setting of the width in the track width direction (inner width direction) of the main magnetic pole layer 24 by etching the sides 24f of the main magnetic pole layer 24.

The predetermined angle $\theta 5$ with respect to the center line C is preferably 45° to 80°, and more preferably 60° to 70°. In this embodiment, the angle $\theta 5$ is 70°.

Figure 17:
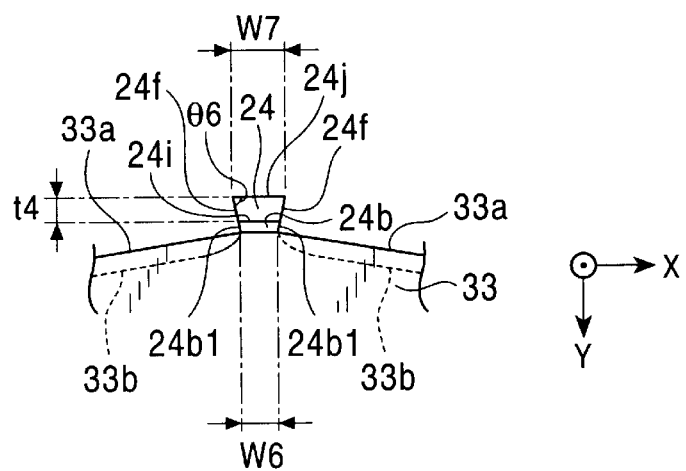
FIG. 17 is a cross-sectional view showing a step in the method for fabricating the perpendicular magnetic recording head.

FIG. 17 is a cross-sectional view of the magnetic pole-forming section 24h of the main magnetic pole layer 24 after ion milling. After ion milling is performed, the upper face 24j of the main magnetic pole layer 24 is planarized and linear.

The plating underlayer 24b in the region other than the region underlying the main magnetic pole layer 24 is removed, and the sides 24f of the main magnetic pole layer 24 and the sides 24b1 of the plating underlayer 24b form continuous straight lines or curved lines. That is, the inner width in the track width direction of the plating underlayer 24b increases with distance from the auxiliary magnetic pole layer 21, and the plating underlayer 24b and the main magnetic pole layer 24 have a substantially inverted trapezoidal cross section.

When the plating underlayer 24b is removed, the material for the plating underlayer 24b adhering to the sides 24f of the main magnetic pole layer 24 is also removed.

The sides 24f of the main magnetic pole layer 24 are etched and the width in the track width direction (in the inner width direction) of the main magnetic pole layer 24 is decreased compared to the state immediately after the formation by plating.

A width W6 in the inner width direction of the lower face 24i of the magnetic pole-forming section 24h of the main magnetic pole layer 24 after ion milling is 0.19 $\mu$m, a width W7 (track width Tw) in the inner width direction of the upper face 24j is 0.49 $\mu$m, and a height t4 is 0.33 $\mu$m. An angle $\theta 6$ (tapering angle) between the upper face 24j and the side 24f is 65°.

When the unwanted plating underlayer 24b formed on the insulating layer 33 in the region other than the region underlying the main magnetic pole layer 24 is removed, the upper surfaces 33a of the insulating layer formed at both sides of the lower face of the main magnetic pole layer 24 are also etched, and the upper surfaces 33a incline downward as the distance from the main magnetic pole layer 24 increases. After ion milling, the upper surfaces of the insulating layer 33 may be curved downward as the distance from the main magnetic pole layer 24 is increased as illustrated by broken lines 33b.

Figure 18:
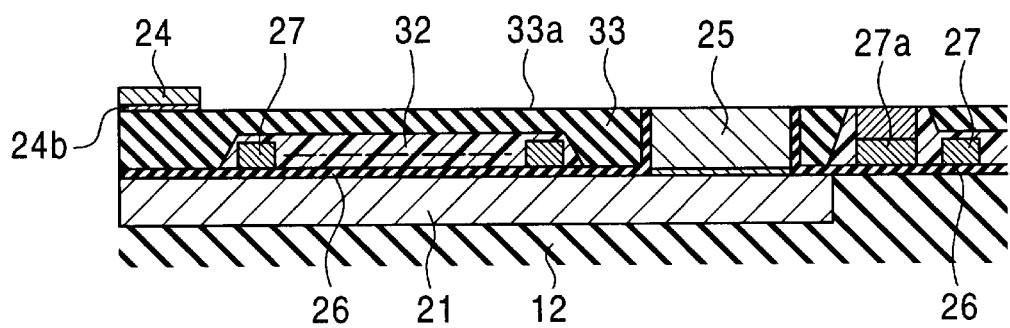
FIG. 18 is a longitudinal sectional view showing a step in the method for fabricating the perpendicular magnetic recording head.

FIG. 18 is a longitudinal sectional view showing the perpendicular magnetic recording head after the step shown in FIG. 17 is completed. In the perpendicular magnetic recording head shown in FIG. 18, the main magnetic pole layer 24 has a substantially inverted trapezoidal cross section shown in FIG. 17.

Figure 19:
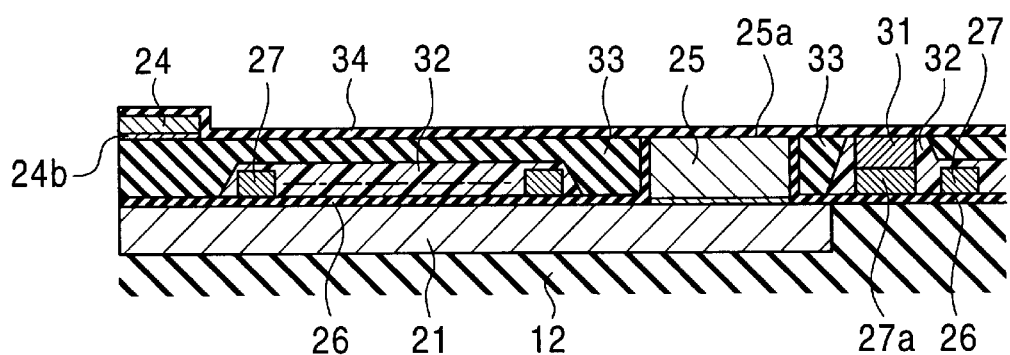
FIG. 19 is a longitudinal sectional view showing a step in the method for fabricating the perpendicular magnetic recording head.

Next, as shown in FIG. 19, an inorganic insulating layer 34 is formed over the main magnetic pole layer 24, the insulating layer 33, the connecting layer 25, and the elevating layer 31.

Additionally, in order to planarize the upper face 24j of the main magnetic pole layer 24, instead of the ion milling method described above, after the main magnetic pole layer 24 is covered by the inorganic insulting layer 34, the upper face 24j may be planarized by CMP.

Figure 20:
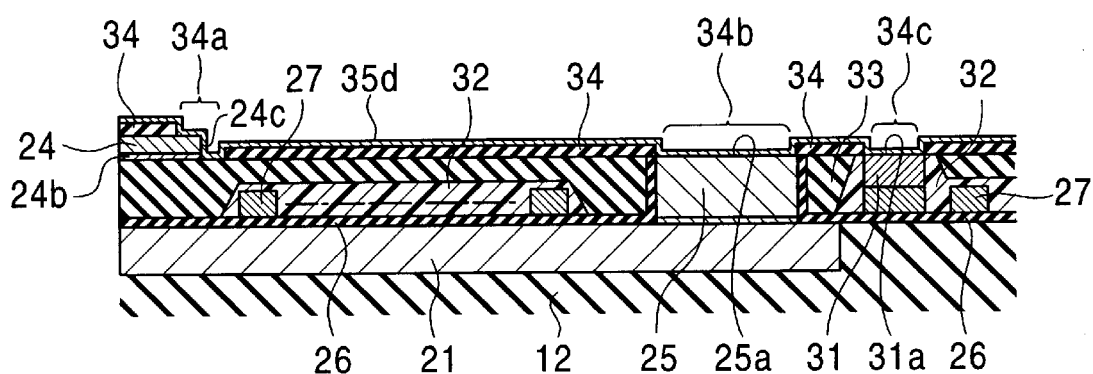
FIG. 20 is longitudinal sectional view showing a step in the method for fabricating the perpendicular magnetic recording head.

Next, as shown in FIG. 20, holes 34a, 34b, and 34c are made so as to expose the back section 24c of the main magnetic pole layer 24, the upper surface 25a of the connecting layer 25, and the upper surface 31a of the elevating layer 31. After the holes 34a, 34b, and 34c are made, a plating underlayer 35d is formed at least on the back section 24c of the main magnetic pole layer 24, on the insulating layer 34, on the upper surface 25a of the connecting layer 25, and the upper surface 31a of the elevating layer 31.

Figure 21:
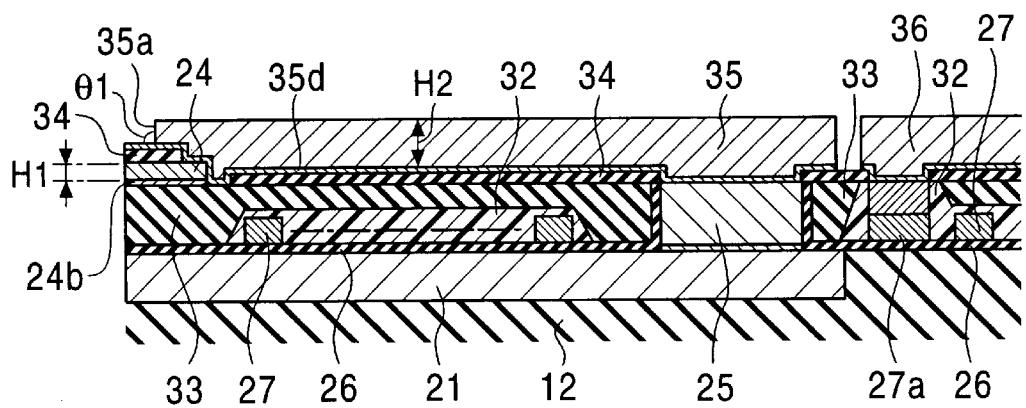
FIG. 21 is a longitudinal sectional view showing a step in the method for fabricating the perpendicular magnetic recording head.

The plating underlayer 35d is composed of a magnetic material, such as NiFe or Ni, or a nonmagnetic material, such as Cu, Au, Pd, Rh, Ru, Pt, NiLu, NiP, NiPd, NiW, NiB, NiMo, Ir, NiCu, NiCr, Cr, or Ti. Next, as shown in FIG. 21, a yoke layer 35 is formed by plating so as to be magnetically coupled to the main magnetic pole layer 24 and the connecting layer 25. The width in the track width direction of the yoke layer 35 is wider than the width of the main magnetic pole layer 24 at the position where the yoke layer 35 overlies the main magnetic pole layer 24.

In order to form the planar shape of the main magnetic pole layer 24 as shown FIG. 4 or 5, in the step shown in FIG. 11, the shape of the recess 40a1 for forming the magnetic pole is set to be the same shape as that of the main magnetic pole layer 24 shown in FIG. 4 or 5 when the resist layer 40 is subjected to exposure/development.

The front region of the yoke layer 35 may have a shape shown in any one of FIGS. 3 to 5, and the yoke layer 35 is overlaid on the main magnetic pole layer 24 in a manner as shown in any one of FIGS. 3 to 5.

The front end 35a of the yoke layer 35 is placed toward the back in the height direction from the surface facing the recording medium.

In this embodiment, the thickness H2 of the yoke layer 35 is larger than the thickness H1 of the main magnetic pole layer 24.

The front end 35a of the yoke layer 35 is perpendicular to the height direction (the X direction). However, the front end 35a of the yoke layer 35 may have an inclined surface or a curved surface in which the depth in the height direction gradually increases from the lower surface to the upper surface. An external angle θ1 between the upper surface of the main magnetic pole layer 24 formed below the yoke layer 35 and the front end 35a of the yoke layer 35 is preferably 90° or more. Consequently, a leakage magnetic field from the main magnetic pole layer 24 to the yoke layer 35 can be decreased and the magnetic field can be further concentrated in the main magnetic pole layer 24.

The main magnetic pole layer 24 is preferably composed of a magnetic material having a higher saturation magnetic flux density $B_s$ than the yoke layer 35.

A lead layer 36 which is electrically connected to the elevating layer 31 is formed by plating on the elevating layer 31, using a conductive material, such as Cu, and the unwanted plating underlayer 35d in the periphery of the yoke layer 35 and the lead layer 36 is removed by ion milling.

Additionally, the lead layer 36 may be formed simultaneously with the yoke layer 35, using a magnetic material.

Next, a protective layer 13 shown in FIG. 1 is formed. Furthermore, the surface Hva is ground, and the front end 21b of the auxiliary magnetic pole layer 21, the front end 33c of the insulating layer 33, and the front end 24a of the main magnetic pole layer 24 are exposed so as to be on the same level.

As necessary, the surface 11a of the slider and the surface Hva of the perpendicular magnetic recording head Hv shown in FIG. 1 are covered by a wear resistant protective film mainly composed of carbon, such as diamond like carbon (DLC).

In the finished perpendicular magnetic recording head shown in FIGS. 1 and 5, the width Tw in the track width direction of the front end 24a of the main magnetic pole layer 24 exposed at the surface Hva is set to be sufficiently smaller than the width Wr in the track width direction of the front end 21b of the auxiliary magnetic pole layer 21 exposed at the surface Hva, and also as shown in FIG. 1, the thickness H1 of the main magnetic pole layer 24 is set to be smaller than the thickness H3 of the auxiliary magnetic pole layer 21. That is, the area of the front end 24a of the main magnetic pole layer 24 exposed at the surface Hva is set to be sufficiently smaller than the area of the front end 21b of the auxiliary magnetic pole layer 21.

The thickness H1 of the main magnetic pole layer 24 is set to be smaller than the thickness H2 of the yoke layer 35. The cross-sectional area of the main magnetic pole layer 24 is set to be smaller than the cross-sectional area of the back region of the yoke layer 35 when taken along a surface parallel to the surface Hva.

In accordance with the method in this embodiment, in the step shown in FIGS. 12A and 12B, heat treatment is performed so that the sides 40b of the recess 40a formed in the resist layer 40 have inclined surfaces. In another method for forming inclined or curved sides 40b of the recess 40a, the patterning accuracy is adjusted by selecting the exposure sensitivity of the material for the resist layer 40 so that the inner width of the upper face of the resist layer is larger than the inner width of the lower face of the resist layer and the sides 40b have inclined or curved surfaces during exposure and development.

In the step shown in FIGS. 11A and 11B, the recess 40a may be extended to the position which overlies the connecting layer 25 so that the main magnetic pole layer 24 and the connecting layer 25 are magnetically coupled to each other.

Additionally, when the plating underlayer 24b is formed using a nonmagnetic material in the step shown in FIGS.

11A and 11B, a degradation in magnetic recording characteristics can be suppressed even if the plating underlayer 24b is not completely removed in the region other than the region underlying the main magnetic pole layer 24 in the step shown in FIG. 16.

That is, even if the sides 24f of the main magnetic pole layer 24 and the sides 24b1 of the plating underlayer 24b do not form straight lines or curved lines, for example, as shown in FIG. 22, even if the width W9 (width in the track width direction) of the plating underlayer 24b is larger than the width W8 (width in the track width direction) of the lower base 24d of the main magnetic pole layer 24, it is possible to prevent the recording track pattern on the recording medium from being disturbed.

In FIG. 1, the upper shield layer 51 and the auxiliary magnetic pole layer 21 may be consolidated so that one magnetic layer functions as an upper shield layer as well as an auxiliary magnetic pole layer.

Additionally, only the perpendicular magnetic recording head Hv may be mounted on the trailing edge of the slider 11 without providing the read section $H_R$.

EXAMPLES

Figure 23:
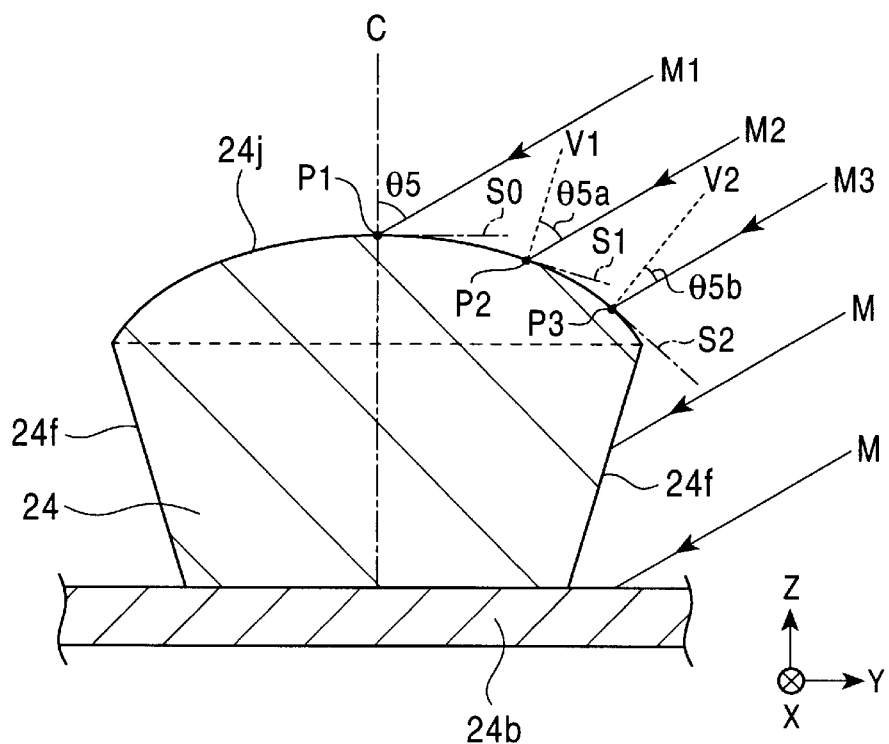
FIG. 23 is a cross-sectional view of a main magnetic pole layer to which ion milling is performed.

FIG. 23 is a partial sectional view of the main magnetic pole layer and its vicinity of the perpendicular magnetic recording head in the step shown in FIG. 16.

Ion milling is performed on the main magnetic pole layer 24 in which milling particles are anisotropically emitted at a predetermined angle θ5 with respect to the center line C in the longitudinal direction of the main magnetic pole layer 24.

Figure 24:
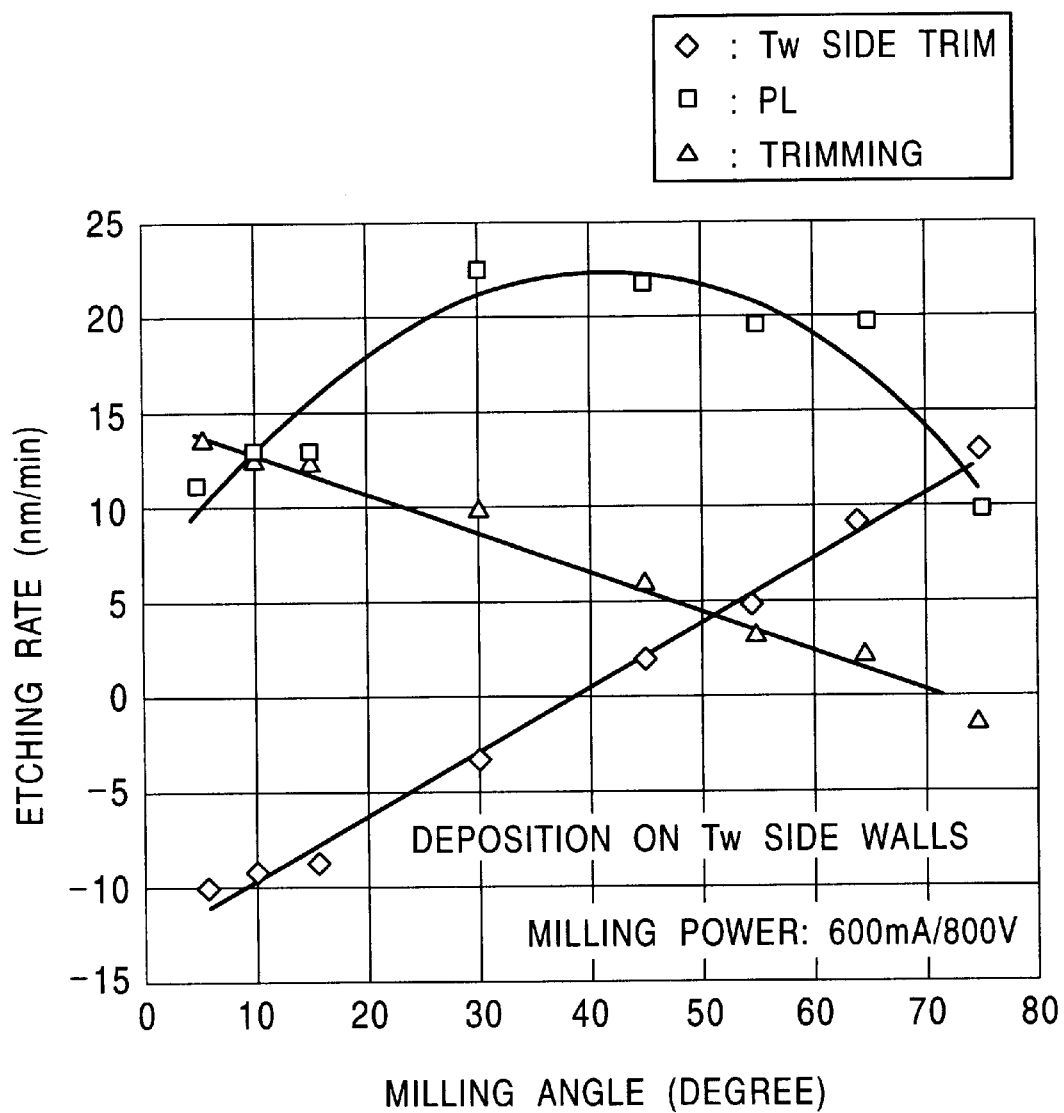
FIG. 24 is a graph showing the relationship between the ion milling angle and the etching rate for a main magnetic pole layer.

FIG. 24 is a graph showing the relationship between the milling angle with respect to the center line C in the longitudinal direction of the main magnetic pole layer 24 and the etching rate.

The curve plotted by symbol □ shows the etching rate in the height direction of the main magnetic pole layer 24 (in the Z direction in FIG. 23). The etching rate in the height direction of the main magnetic pole layer 24 depends on the milling angle with respect to the center line C. As is obvious from the graph, the etching rate is largest when the milling angle is approximately 40°. The etching rate decreases as the milling angle decreases from or increases from approximately 40°. In particular, when the milling angle is approximately 70°, a change in the etching rate is largest with respect to a change in the milling angle.

As shown in FIG. 23, since the upper surface 24j of the main magnetic pole layer 24 is a curved surface in a convex form, when milling particles are anisotropically emitted at the predetermined angle θ5 with respect to the center line C, each point on the upper surface 24j has a different angle between the normal to the tangent plane and the incident direction of the milling particles at the point.

For example, in FIG. 23, at point P1, the angle between the normal to the tangent plane S0 (center line C) and the incident direction of milling particles M1 is θ5. At point P2, the angle between the normal V1 to the tangent plane S1 and the incident direction of milling particles M2 is θ5a, and at point P3, the angle between the normal V2 to the tangent plane S2 and the incident direction of milling particles M3 is θ5b. In such a case, θ5≠θ5a≠θ5b. Therefore, there is a difference in the milling rate at the individual points on the upper surface 24j of the main magnetic pole layer 24.

In accordance with the present invention, when the upper surface 24j of the main magnetic pole layer 24 is etched by ion milling, since etch point on the upper surface 24j has a different etching rate, and also since the distribution of the etching rate on the upper surface 24j changes as the etching proceeds, the curvature of the upper surface 24j of the main magnetic pole layer 24 is gradually smoothed and finally the upper surface 24j can be a flat surface as shown in FIG. 17.

Additionally, by performing ion milling in which milling particles are anisotropically emitted at the predetermined angle θ5 with respect to the center line C, the plating underlayer 24b in the region other than the region underlying the min magnetic pole layer 24 is removed, the sides 24f are etched, and the width in the track width direction (in the Y direction) of the main magnetic pole layer 24 is decreased simultaneously.

However, as is obvious from the curve plotted by symbol ◇ which shows the etching rate in the track width direction, as the angle θ5 decreases, the etching rate is decreased to a negative value. That is, the width in the track width direction (in the Y direction) of the main magnetic pole layer 24 is increased compared to the width immediately after the formation by plating. The reason for this is that the ratio of adhesion of the removed plating underlayer 24b to the sides 24f increases as the angle θ5 decreases.

In order to decrease the ratio of adhesion of the plating underlayer 24b to the sides 24f and to efficiently perform etching of the main magnetic pole layer 24 in the track width direction, the angle θ5 is preferably 45° or more.

If the milling rate in the height direction of the main magnetic pole layer 24 is too low, the etching efficiency is decreased. Therefore, the angle θ5 is preferably 80° or less.

More preferably, the angle θ5 is 70° or less. However, if the milling rate in the height direction of the main magnetic pole layer 24 is too high, the volume of the finished main magnetic pole layer 24 is decreased, resulting in a degradation in the magnetic recording characteristic. Therefore, the angle θ5 is preferably 60° or more.

If the angle θ5 is 60° to 70°, a change in the etching rate relative to the change in the angle θ5 can be increased, and a difference in the etching rate among the individual points on the upper surface 24j can be increased, and thus the upper surface 24j can be efficiently planarized.

Figure 25:
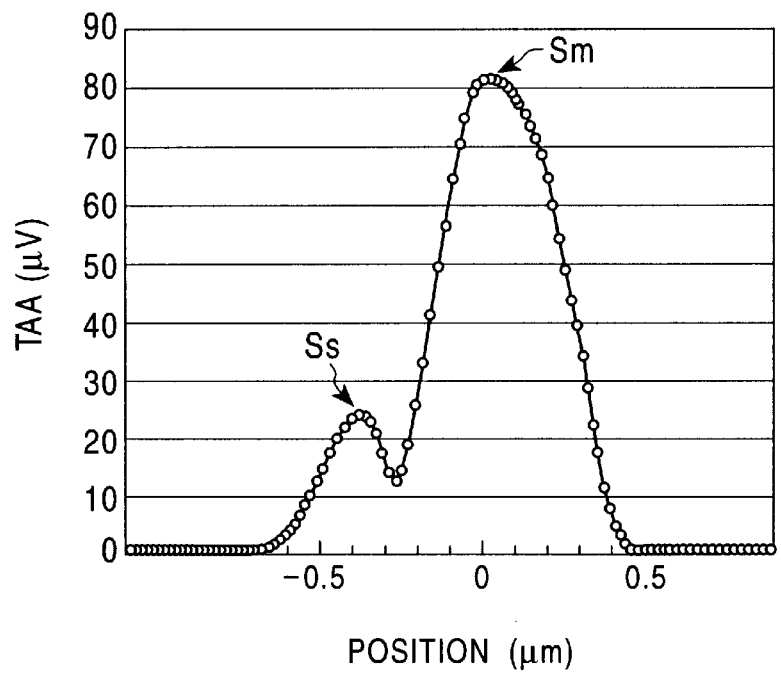
FIG. 25 is a graph showing the magnetic recording characteristic of a perpendicular magnetic recording head in which a plating underlayer composed of a magnetic material remains in a region other than the region underlying a main magnetic pole layer.
Figure 26:
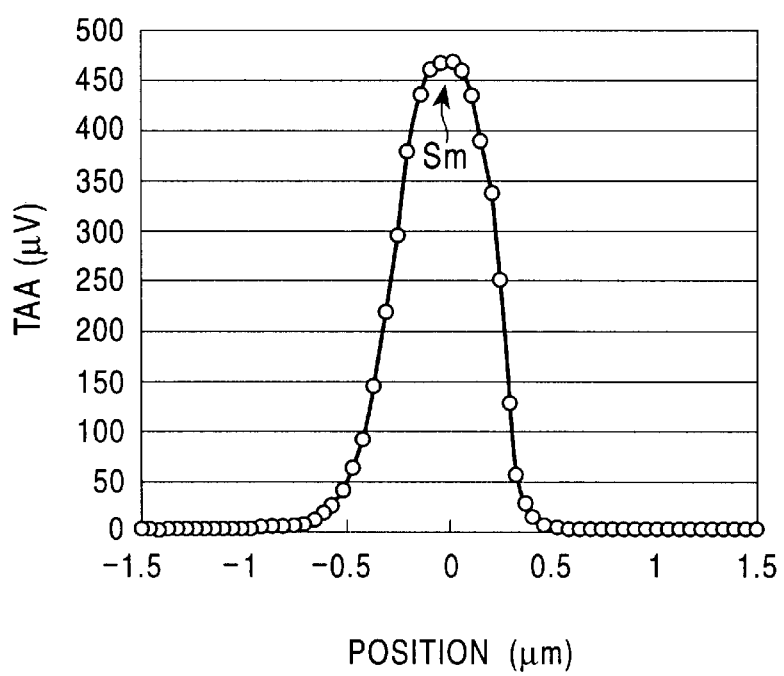
FIG. 26 is a graph showing the magnetic recording characteristic of a perpendicular magnetic recording head in which a plating underlayer composed of a nonmagnetic material remains in a region other than the region underlying a main magnetic pole layer.
Figure 27:
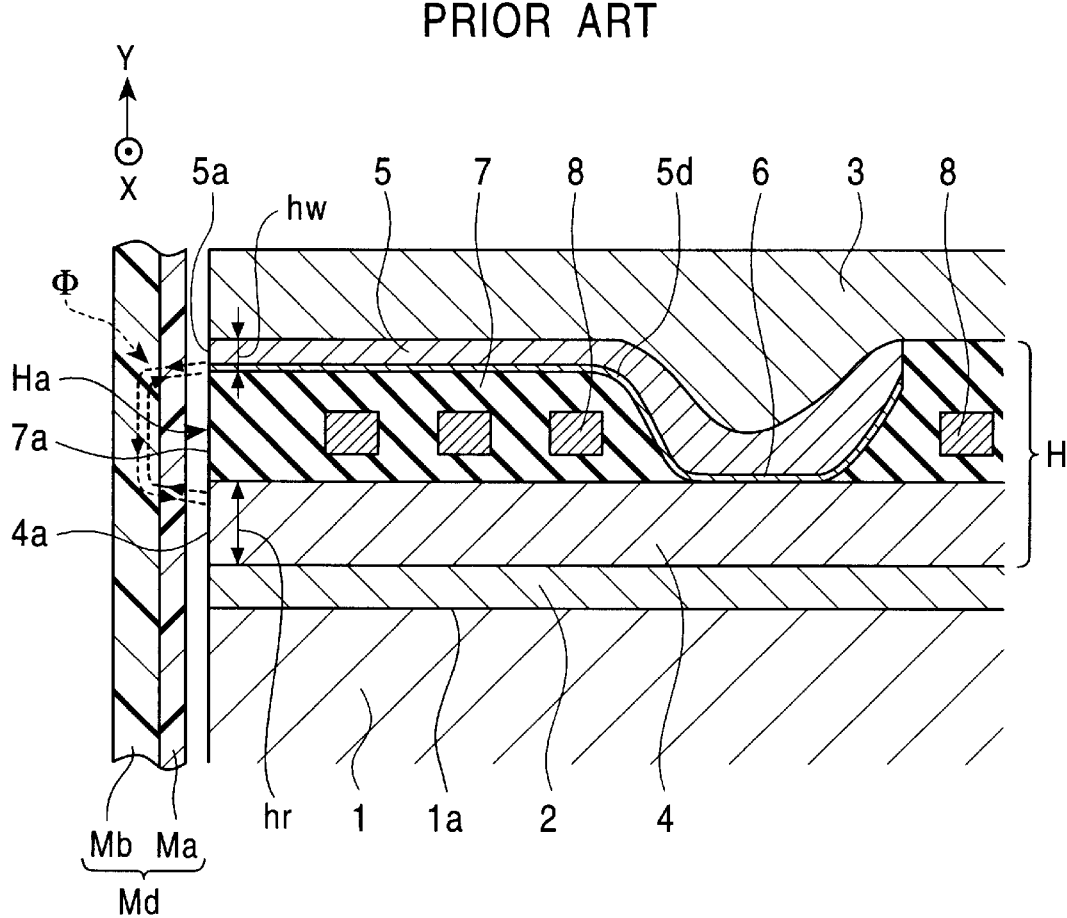
FIG. 27 is a sectional view of a conventional perpendicular magnetic recording head.
Figure 28:
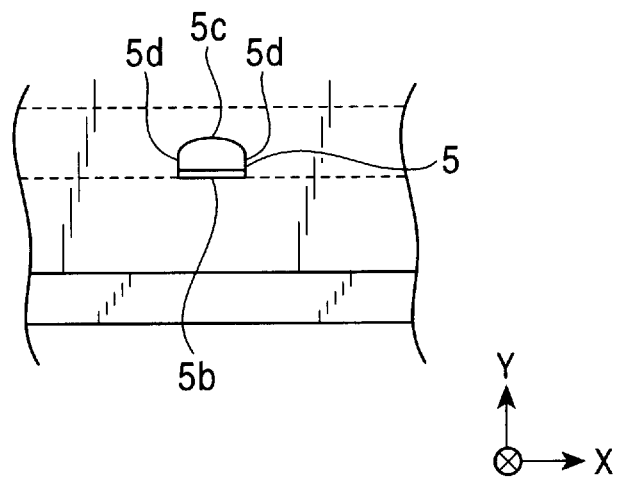
FIG. 28 is a partial front view of the perpendicular magnetic recording head shown in FIG. 27.
Figure 29:
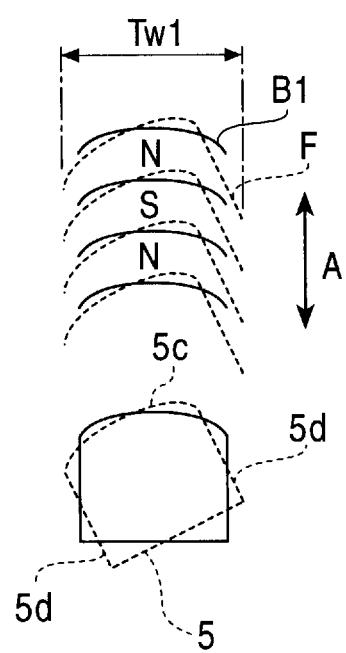
FIG. 29 is a schematic diagram showing a state in which a skew angle occurs in the perpendicular magnetic recording head shown in FIG. 27.

FIG. 25 is a graph showing the magnetic recording characteristic of a perpendicular magnetic recording head in which a plating underlayer 24b is composed of a magnetic material when the plating underlayer 24b is not completely removed from the region other than the region underlying the main magnetic pole layer 24 in the step shown in FIG. 16. FIG. 26 is a graph showing the magnetic recording characteristic of a perpendicular magnetic recording head in which a plating underlayer 24b is composed of a nonmagnetic material when the plating underlayer 24b is not completely removed from the region other than the region underlying the main magnetic pole layer 24 in the step shown in FIG. 16.

In FIGS. 25 and 26, the magnetic recording characteristics were measured by a microtrack profile method.

In the microtrack profile method, a signal, as a microtrack, is recorded on a magnetic recording medium, and by moving a read element, such as a magnetoresistive element, over the recording track in the track width direction, the read output is measured, and thereby the distribution of recording signal intensity in the track width direction on the recording track is obtained.

As shown in FIG. 25, when the plating underlayer 24b composed of the magnetic material remains in the region other than the region underlying the main magnetic pole layer 24, the peak of a side signal Ss appears in addition to the peak of a main signal Sm. The side signal Ss is written by the plating underlayer 24b remaining in the region other than the main magnetic pole layer 24.

As shown in FIG. 26, when the plating underlayer 24b composed of the nonmagnetic material remains in the region other the region underlying the main magnetic pole layer 24, only the peak of a main signal Sm appears on the recording track, and a side signal Ss is not detected.

That is, it has been confirmed that when the plating underlayer 24b is composed of the nonmagnetic material, even if the sides 24f of the main magnetic pole layer 24 and the sides 24b1 of the plating underlayer 24b do not form straight lines or curved lines, for example, as shown in FIG. 22, even if the width W9 in the track width direction of the plating underlayer 24b is larger than the width W8 in the track width direction of the lower base 24d of the main magnetic pole layer 24, it is possible to prevent the side signal Ss from appearing on the recording medium and to prevent the recording track pattern from being disturbed.

Therefore, by forming the plating underlayer 24b using a nonmagnetic material, the perpendicular magnetic recording head which is suitable for higher recording densities can be easily obtained.

What is claimed is:

1. A perpendicular magnetic recording head comprising:
   an auxiliary magnetic pole layer exposed at a surface facing a recording medium;
   a main magnetic pole layer exposed at the surface facing the recording medium, the main magnetic pole layer being deposited on the auxiliary magnetic pole layer with an insulating layer therebetween;
   a coil layer for applying a recording magnetic field to the auxiliary magnetic pole layer and the main magnetic pole layer, the coil layer being provided toward the back from the surface facing the recording medium, wherein magnetic data is written in the recording medium by the magnetic field concentrating in the main magnetic pole layer perpendicular to the plane of the recording medium; and
   a connecting layer placed on the auxiliary magnetic pole layer toward the back from the surface facing the recording medium, the main magnetic pole layer and the connecting layer being magnetically coupled to each other directly or by a yoke layer formed on the main magnetic pole layer and on the connecting layer, wherein, at the surface facing the recording medium, the upper base of the main magnetic pole layer is wider than the lower base at the auxiliary magnetic pole layer side of the main magnetic pole layer so that the width in the track width direction of the main magnetic pole layer gradually increases with distance from the auxiliary magnetic pole layer, and
   wherein the main magnetic pole layer is formed on a plating underlayer comprising a magnetic material, at least a part of the sides in the track width direction of the plating underlayer protrudes from either end in the track width direction of the lower base at the auxiliary magnetic pole layer side of the main magnetic pole layer, and the protrusion does not exceed a recording track width written in the recording medium when a skew angle occurs during writing.

2. A perpendicular magnetic recording head according to claim 1, wherein the upper base of the main magnetic pole layer is linear.

3. A perpendicular magnetic recording head according to claim 1, wherein the main magnetic pole layer is formed by plating on a plating underlayer comprising a nonmagnetic metallic material.

4. A perpendicular magnetic recording head according to claim 3, wherein the width in the track width direction of the plating underlayer is larger than the width in the track width direction of the bottom of the main magnetic pole layer.

5. A perpendicular magnetic recording head according to claim 1, wherein the area of a front end of the main magnetic pole layer exposed at the surface facing the recording medium is sufficiently smaller than the area of a front end of the auxiliary magnetic pole layer exposed at the surface facing the recording medium, and at a cross section parallel to the surface facing the recording medium, the cross-sectional area of the main magnetic pole layer is smaller than the cross-sectional area of the yoke layer.

6. A perpendicular magnetic recording head according to claim 1, wherein the saturation magnetic flux density of the main magnetic pole layer is higher than the saturation magnetic flux density of the yoke layer.

7. A perpendicular magnetic recording head according to claim 1, wherein a front end of the yoke layer is placed toward the back from the surface facing the recording medium.

* * * * *

UNITED STATES PATENT AND TRADEMARK OFFICE
CERTIFICATE OF CORRECTION

PATENT NO. : 6,697,221 B2
DATED : February 24, 2004
INVENTOR(S) : Kiyoshi Sato et al.

It is certified that error appears in the above-identified patent and that said Letters Patent is hereby corrected as shown below:

<u>Title page,</u>
Item [56], References Cited, U.S. PATENT DOCUMENTS, insert:
-- 4,546,398    10/1985        Toda et al.
   4,636,897     1/1987        Nakamura et al.
   4,873,599    10/1989        Sueoka --; and insert
-- FOREIGN PATENT DOCUMENTS
JP      8-106613       04/1996
JP     10-320720       12/1998 --.

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,697,221 B2
DATED        : February 24, 2004
INVENTOR(S)  : Kiyoshi Sato et al.

It is certified that error appears in the above-identified patent and that said Letters Patent is hereby corrected as shown below:

Title page,
Item [73], Assignee, delete "Electronic" and substitute -- Electric -- in its place.

Signed and Sealed this

Seventeenth Day of August, 2004

JON W. DUDAS
*Acting Director of the United States Patent and Trademark Office*